(12) United States Patent
Moessnang et al.

(10) Patent No.: US 10,644,502 B2
(45) Date of Patent: May 5, 2020

(54) CONTROL METHOD FOR AN ELECTRIC POWER TOOL

(71) Applicant: Hilti Aktiengesellschaft, Schaan (LI)

(72) Inventors: Franz Moessnang, Stadtbergen (DE); Laurent-Sebastian Kock, Poing (DE); Karl Neuper, Roethis (AT)

(73) Assignee: Hilti Aktiengesellschaft, Schaan (LI)

( * ) Notice: Subject to any disclaimer, the term of this patent is extended or adjusted under 35 U.S.C. 154(b) by 333 days.

(21) Appl. No.: 15/737,237

(22) PCT Filed: Jun. 14, 2016

(86) PCT No.: PCT/EP2016/063590
§ 371 (c)(1),
(2) Date: Dec. 15, 2017

(87) PCT Pub. No.: WO2016/202776
PCT Pub. Date: Dec. 22, 2016

(65) Prior Publication Data
US 2018/0175617 A1 Jun. 21, 2018

(30) Foreign Application Priority Data
Jun. 17, 2015 (EP) .................................... 15172462

(51) Int. Cl.
*H02H 11/00* (2006.01)
*B25F 5/00* (2006.01)
*B23Q 11/00* (2006.01)

(52) U.S. Cl.
CPC ......... *H02H 11/00* (2013.01); *B23Q 11/0078* (2013.01); *B25F 5/00* (2013.01)

(58) Field of Classification Search
CPC ........ H02H 11/00; B23Q 11/0078; B25F 5/00
(Continued)

(56) References Cited

U.S. PATENT DOCUMENTS 4,086,643 A 4/1978 Jacobs
5,723,914 A * 3/1998 Nakayama ............. H01H 9/548
307/125

(Continued)

FOREIGN PATENT DOCUMENTS

DE 44 29 206 A1 3/1996
DE 196 16 851 A1 10/1996

OTHER PUBLICATIONS

PCT/EP2016/063590, International Search Report (PCT/ISA/210 and PCT/ISA/220) dated Oct. 6, 2016, with partial English translation, enclosing Written Opinion of the International Searching Authority (PCT/ISA/237) (Fifteen (15) pages).

*Primary Examiner* — Hal Kaplan
*Assistant Examiner* — Swarna N Chowdhuri
(74) *Attorney, Agent, or Firm* — Crowell & Moring LLP

(57) ABSTRACT

A power tool has a tool holder, an electric motor, a handle, and a main switch for switching on the electric motor. The power tool executes the following control method. The main switch is scanned to see whether it has been actuated. A start inhibitor transmits a blocking signal to a motor controller if the main switch is actuated before the power tool has been connected to the power supply. An activator receives signals from a control unit separate from the electric power tool, compares the received signals with a predefined signature and transmits a release signal to the motor controller if the received signal corresponds to the predefined signature. The motor controller switches on the electric motor in response to actuation of the main switch if the start inhibitor is not transmitting a blocking signal or the activator is transmitting a release signal.

7 Claims, 1 Drawing Sheet

(58) Field of Classification Search
USPC .......................................................... 307/326
See application file for complete search history.

(56) References Cited

U.S. PATENT DOCUMENTS 6,005,489 A * 12/1999 Siegle ................ G08B 13/1418
310/50
2002/0117902 A1 8/2002 Evers et al.
2012/0306291 A1* 12/2012 Wirnitzer ................. B23Q 5/10
307/141

* cited by examiner

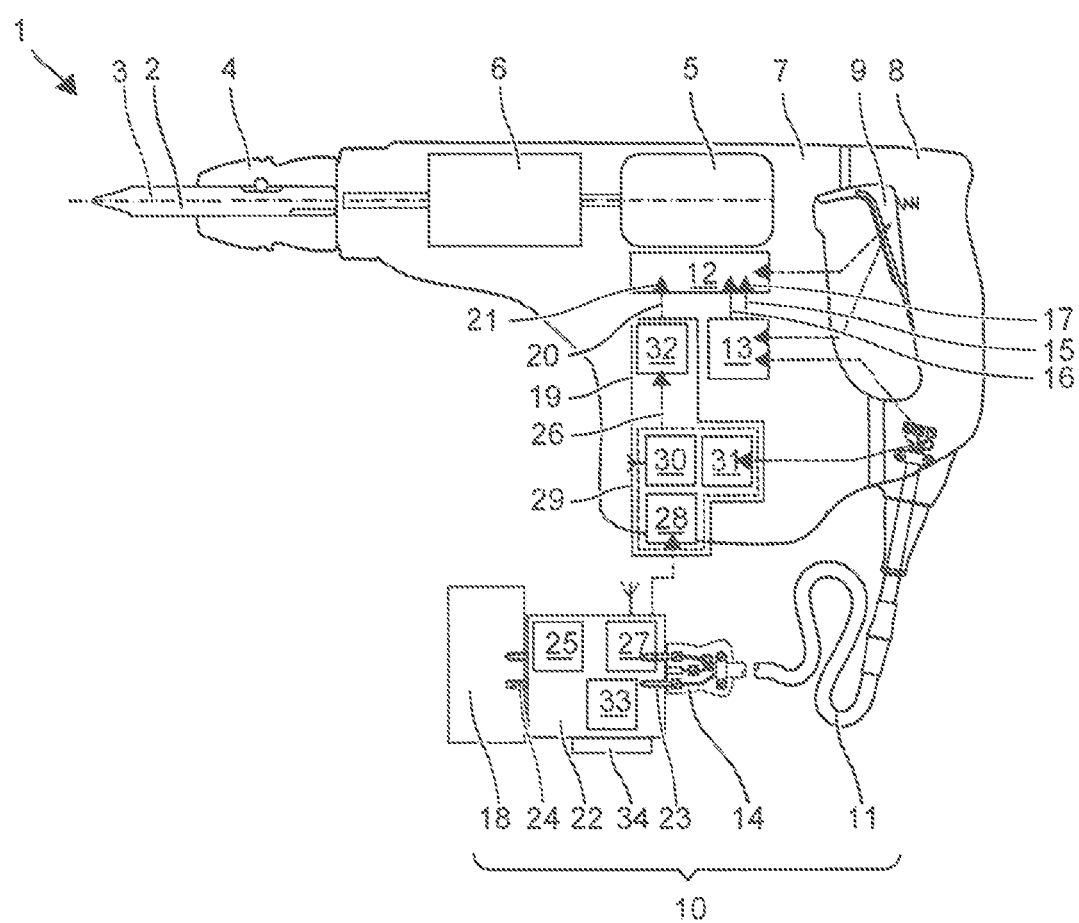

CONTROL METHOD FOR AN ELECTRIC POWER TOOL

This application claims the priority of International Application No. PCT/EP2016/063590, filed Jun. 14, 2016, and European Patent Document No. 15172462.2, filed Jun. 17, 2015, the disclosures of which are expressly incorporated by reference herein.

BACKGROUND AND SUMMARY OF THE INVENTION

The invention relates to a control method for a handheld electric power tool.

Handheld electric power tools are furnished with a start inhibitor as known from US 2012 306291 A1. The start inhibitor prevents the power tool from starting if it is connected to a power supply with the main switched depressed.

The invented power tool has a tool holder, an electric motor for driving the tool holder in rotation, a handle for guiding the power tool during operation, and a main switch for switching on the electric motor. The power tool executes the following control method. The main switch is scanned to see whether it has been actuated. A start inhibitor transmits a blocking signal to a motor controller if the main switch is actuated before the power tool has been connected to the power supply. An activator receives signals from a control unit separate from the electric power tool, compares the received signals with a predefined signature and transmits a release signal to the motor controller if the received signal corresponds to the predefined signature. The motor controller switches on the electric motor in response to the actuation of the main switch, under the additional condition that the start inhibitor is not transmitting a blocking signal or the activator is transmitting a release signal.

The power tool reliably protects the user from an accidental start which can especially occur when the power tool's power plug is plugged in. The power tool can also be turned on and off remotely by turning off the start inhibitor using an appropriately coded signal.

The description below discloses the invention using example embodiments and the FIGURE.

BRIEF DESCRIPTION OF THE DRAWING

FIG. 1 illustrates an electric drill of the present invention.

DETAILED DESCRIPTION OF THE DRAWING

FIG. 1 shows an electric drill 1 as an example of handheld electric power tools with a rotating tool 2. The electric drill 1 has a tool holder 4 that rotates around a working axis 3 for holding a tool 2. The tool 2 can be a drill, a screwdriver bit, a grinding head, etc. The tool holder 4 is coupled to an electric motor 5 that can drive the tool holder 4 in rotation around the working axis 3. The electric motor 5 is arranged in a machine housing 7 along with other components of a power train 6, e.g., a gear mechanism, a friction clutch. A handle 8 on the machine housing 7 allows the user to hold and guide the electric drill 1 during operation. A main switch that turns the electric motor 5 on and off 9 is arranged on or near the handle 8. The electric drill 1 is provided with a power supply 10 through a power line 11. Other similar rotating handheld power tools include, among others, an electric screwdriver, a friction saw, and a buzz saw.

The electric motor 5 is controlled by a motor controller 12. The motor controller 12 scans the main switch 9. In the simplest case, the main switch 9 is a monostable electric push button that opens electric contacts in its base position and closes the electric contacts in an actuated position. The electric button can transmit a binary signal that only differentiates between the base position and the actuated position. Alternately, the button can transmit a continuous or coded signal that gives information about the pressing force on the button or the actuation path of the button. For example, the button contains an electric slideway on which the contact slides, resulting in a varying resistance depending on the actuation path of the contact. A spring keeps the button in the base position when the main switch 9 is unactuated. It is advantageous if the motor controller 12 supplies the electric motor 5 with power when the main switch 9 has closed contacts in the pressed position and the motor controller 12 separates the electric motor 5 from the power supply 10 when the main switch 9 is in the base position with open contacts.

The main controller 12 includes a start inhibitor 13 that prevents unintended starting of the electric motor 5. Unintended starting could occur if the user plugs the power plug 14 of the drill 1 into the power outlet and the main switch 9 is jammed in the pressed position. When this happens, the user is typically holding the drill 1 only loosely and the rotating tool 2 can directly or indirectly injure him or her.

The start inhibitor 13 determines the temporal order of two events, namely the connection of an energy supply and the actuation of the main switch 9. The start inhibitor 13 transmits an unblocking signal 15 if the main switch 9 is actuated after the power supply 10 is connected. The start inhibitor 13 transmits a blocking signal 16 if the main switch 9 is already actuated before the power supply 10 is connected. The start inhibitor 13 switches from the blocking signal 16 to the unblocking signal 15 if the main switch 9 is triggered while the power supply 10 is connected. The motor controller 12 receives the signals transmitted by the start inhibitor 13 at an input 17. If unblocking signal 15 is on, the motor controller 12 starts the electric motor 5 in accordance with the pressed main switch 9. If the blocking signal 16 is on, the motor controller 12 keeps the electric motor 5 separated from the power supply 10. If the motor controller 12 does not receive a signal at the inlet 17, the electric motor 5 is also held separate from the power supply 10 as a precaution.

The start inhibitor 13 has, for example, a register that drops to zero if the power supply 10 to the electric drill 1 is absent or insufficient. The register may, for example, be a small capacitor that discharges through a resistance. The register is set and kept at one after the start inhibitor 13 is supplied with power for a minimum time. However, the register is only set to one if the main switch 9 is in the unactuated base position. The start inhibitor 13 transmits the blocking signal 16 if the value is zero and the unblocking signal 15 if the value is one.

From the user's point of view, the drill 1 cannot be started if the main switch 9 is already pressed when the power plug 14 is plugged in. After the main switch 9 is let go and re-actuated, the drill 1 starts. The user usually does not notice the start inhibitor 13 because typically the power plug 14 is plugged into a power outlet 18 to connect the power supply 10 before the user picks up the drill 1 and actuates the main switch 9.

The motor controller 12 is furnished with an activator 19. In inactive status, the activator 19 has no influence on the motor controller 12 and the start inhibitor 13. In active status, the activator 19 bypasses the start inhibitor 13. The motor controller 12 connects the electric motor 5 to the power supply 10 regardless of the order of the two events: connection of energy supply and actuation of main switch 9. In active status, for example, the activator 19 transmits a release signal 20 that is directed into the input 21 of the motor controller 12. The release signal 20 of the activator 19 and the unblocking signal 15 of the start inhibitor 13 are the same. The motor controller 12 does not distinguish between the two signals and starts the electric motor 5 accordingly if the main switch 9 is actuated. The electric drill 1 can now be turned on and off by turning the power supply 10 on and off externally. This may, for example, be helpful if the drill 1 is held in a drill rig. If a blocking signal 16 from the start inhibitor 13 arrives at the motor controller 12, the motor controller 12 can regularly check whether a release signal 20 has arrived at the input 21. The release signal 20 may be transmitted delayed after the blocking signal 16, for example, in order to execute other actions after connection to a supply current before the electric motor 5 of the drill 1 begins to turn. The release signal 20 is preferably only removed after the power supply 10 falls off.

The activator 19 communicates with an external control unit 22. The control unit 22 may, for example, be designed as a plug-in module that can be switched into the power supply pathway 10 of the drill 1. The control unit 22 may, for example, have a power outlet 23 into which the power plug 14 of the drill 1 can be plugged and a plug 24 that can be plugged into a power outlet 18 like a power plug. The control unit 22 may, for example, have a voltage sensor 25 that detects the presence of a voltage in the power supply 10. The control unit 22 actively sends a signal 26 via a transmitter 27 if a voltage is present. The transmitter 27 can be a radio transmitter that transmits the signal 26 wirelessly. Alternatively, the transmitter 27 can modulate the signal 26 to the supply current. In addition, the transmitter 27 can have a separate cable connection to the drill 1 that may, for example, be plugged into a plug connection 28 on the machine housing 7. The signal 26 contains at least one activation code. The activator 19 contains a receiver 29 that receives the signal 26. Depending on the transmitter 27 provided, the receiver 29 may contain a radio receiver 30, a demodulator 31 that demodulates the supply current, and/or a plug connection 28 on the machine housing 7. The receiver 29 forwards the signal 26 to a decoder 32. The decoder 32 compares the signal 26 to an activation code. If the activation code is contained in the signal 26, the decoder 32 outputs the release signal 20 to the motor controller 12. Alternatively, the control unit 22 sends a query signal as soon as the power plug 14 is plugged in and a power supply 10 to the drill 1 is established. The control unit 22 responds to the query signal with a signal 26 containing the activation code.

The external control unit 22 can transmit one or more control codes in addition to the activation code that are then stored in a memory 33. The control code may, for example, contain instructions for what speed the drill 1 should run at or with what acceleration the drill 1 should start up or what maximum torque the drill 1 should apply. The control codes may, for example, be permanently stored in the memory 33 and be selectable or enterable by a selector switch 34 or analogous input field on the control unit 22. The activator 19 decodes the transmitted control code using the decoder 32. The decoder 32 forwards corresponding control signals to the motor controller 12, which sets the speed, limits the acceleration, and/or limits the torque according to the control signals.

The invention claimed is:

1. A control method for an electric power tool, comprising the steps of:
    scanning whether a main switch is actuated;
    transmitting a blocking signal to a motor controller by a start inhibitor if the main switch is actuated before the electric power tool is connected to a power supply;
    receiving a signal by an activator from a control unit separate from the electric power tool;
    comparing the received signal with an activation code;
    transmitting a release signal to the motor controller by the activator if the received signal matches the activation code; and
    switching on an electric motor of the electric power tool by the motor controller when the main switch is actuated if the start inhibitor is not transmitting the blocking signal or if the activator is transmitting the release signal.

2. The control method according to claim 1, further comprising the step of transmitting the signal by the control unit with the activation code wirelessly.

3. The control method according to claim 2, wherein the signal with the activation code is received wirelessly.

4. The control method according to claim 1, further comprising the step of transmitting the signal by the control unit with the activation code, wherein a control code is transmitted with the activation code, and wherein the motor controller sets a speed, an acceleration, and/or a torque based on the control code.

5. An electric power tool, comprising:
    a machine housing;
    a handle disposed on the machine housing;
    a tool holder for holding a tool on a working axis;
    an electric motor, wherein the tool holder is drivable in rotation around the working axis by the electric motor;
    a motor controller for controlling the electric motor;
    a main switch for actuation by a user;
    a connection for connecting the electric power tool to a power supply;
    a start inhibitor, wherein the start inhibitor transmits a blocking signal to the motor controller if the main switch is actuated before the electric power tool is connected to the power supply; and
    an activator, wherein the activator has a receiver for receiving a signal from a control unit separate from the electric power tool and has a decoder for comparing a received signal to an activation code, wherein the activator transmits a release signal to the motor controller if the received signal matches the activation code;
    wherein the motor controller switches on the electric motor when the main switch is actuated if the start inhibitor is not transmitting the blocking signal or if the activator is transmitting the release signal.

6. The electric power tool according to claim 5, wherein the receiver has a radio receiver and a demodulator for extraction of signals embedded in the power supply or a plug connection on an outside of the machine housing.

7. The electric power tool according to claim 5, wherein the control unit has a memory with stored control codes and wherein the motor controller sets a speed, an acceleration, and/or a torque according to a control code transmitted by the control unit.

* * * * *